Nov. 10, 1970 W. B. GAUNT, JR 3,540,049

HYBRIDLESS SIGNAL TRANSFER CIRCUITS

Filed Oct. 26, 1967 8 Sheets-Sheet 1

INVENTOR
W. B. GAUNT, JR.
BY J. S. Cubert
ATTORNEY

Nov. 10, 1970 W. B. GAUNT, JR 3,540,049

HYBRIDLESS SIGNAL TRANSFER CIRCUITS

Filed Oct. 26, 1967 8 Sheets-Sheet 2

Nov. 10, 1970 W. B. GAUNT, JR 3,540,049

HYBRIDLESS SIGNAL TRANSFER CIRCUITS

Filed Oct. 26, 1967

8 Sheets-Sheet 8

United States Patent Office 3,540,049

Patented Nov. 10, 1970

3,540,049

HYBRIDLESS SIGNAL TRANSFER CIRCUITS

Wilmer B. Gaunt, Jr., Boxford, Mass., assignor to Bell Telephone Laboratories, Incorporated, Murray Hill and Berkeley Heights, N.J., a corporation of New York Filed Oct. 26, 1967, Ser. No. 678,398
Int. Cl. H04b *3/20*
U.S. Cl. 343—180 23 Claims

ABSTRACT OF THE DISCLOSURE

A signal transfer system using modulation for simultaneously exchanging signals between a plurality of stations is described in which hybridless bilateral transmission circuits are connected between each station and a common transmission network. Each bilateral circuit includes a modulator and a demodulator interconnected by a negative feedback path, which arrangement stabilizes signal transmission. Attenuator networks may be inserted in the bilateral circuit to provide impedance matching to each interconnected station.

BACKGROUND OF THE INVENTION

My invention is related to transmission arrangements and, more particularly, to hybridless bilateral transmision arrangements for communication and related systems in which modulation techniques are used.

In communication systems it is a common practice to transfer signals between interconnected stations via modulated waves comprising carrier signals modified by information signals from each of the interconnected stations. This is done in accordance with the particular modulation scheme employed. The modulation scheme may involve frequency modulation or pulse modulation such as delta modulation. In such systems, the transmission circuitry associated with each station comprises a modulator, a demodulator, elements for coupling outgoing signals from the modulator to the transmission medium, and elements for coupling incoming signals from the transmission medium to the demodulator.

Advantageously, transmission by means of modulated carrier signals may be used to provide an additional communication channel between a central point and a station where there is an already existing channel established over an intetrconecting link by conventional means. The modulated carrier channel and the conventional channel may provide separate communications to two stations over the same interconnecting link.

Connections between the station and the modulator and demodulator must include circuit arrangements to prevent regenerative coupling between the demodulated incoming signal and the outgoing signal being applied to the modulator. If this incoming signal is permitted to appear at the modulator input, regenerative interference may result which can substantially block transmission of signals between stations. In some systems, completely separate incoming and outgoing paths are provided so that interference is avoided. In other systems, a separate circuit is included to isolate the incoming and outgoing signals at each station. This is especially desirable where there are only two-wire connections to the station. In some priorly known systems, hybrid arrangements have been devised for this purpose which comprise specially wound transformers or circuits comprising electronic devices. The transformers used in such arrangements are difficult to construct and expensive. Electronic devices and circuits used for this purpose add to the complexity and cost of the transmission circuitry.

The transmission circuitry connected between a station and the transmission medium should match the impedance of the station at the junction of the transmission circuitry with the station so that signal reflections which may occur in the transmision path are avoided. In the hereinbeforementioned hybrid arrangements, an impedance match is difficult to obtain. Any mismatch in these hybrids, however, introduces a loss which detracts from the efficiency of transmission.

A signal transfer system in which hybridless bilateral transmission circuits couple unmodulated information signals between each station and a common transmission network is disclosed in my copending application Ser. No. 678,352, filed Oct. 26, 1967. The arrangement therein is employed to exchange signals directly between a station and a common transmission network. It alters the magnitude of the signal received by each station and matches the impedance of each bilateral transmission circuit to its connected station.

BRIEF SUMMARY OF THE INVENTION

My invention is concerned with the exchange of signals between stations by means of modulated carrier signals. Hybridless bilateral transmission circuits are utilized for exchanging signals between selected stations interconnected through a common transmission path over which path modulated signals are transmitted. Each bilateral circuit is connected between a station and a common interconnection network. The bilateral circuit operates to modulate a carrier signal in response to an outgoing signal from the station and to couple the modulated outgoing signal to the network. A feedback path is included in the bilateral circuit wherein a signal responsive to the sum of the outgoing modulated signal and any signal incoming from the network is demodulated and applied to the junction of the bilateral circuit with the station. The portion of the fed back signal derived from the outgoing signal subtracts from the outgoing signal at the junction and thereby prevents regenerative interference. The portion of the fed back signal derived from the incoming signal originating at another station is coupled to the connected station.

In accordance with one aspect of my invention, attenuation means may be included in the modulation and feedback paths to improve the impedance match between the bilateral circuit and its connected station.

In a first illustrative embodiment of my invention, the bilateral circuit comprises a frequency modulator which receives the outgoing signal from the associated station. The frequency modulated signal at the modulator output is coupled to the common network. It is also applied to a detector together with a signal incoming from the network. A demodulated signal proportional to the difference in phase between the frequency modulated signal and the incoming signal is obtained from the detector, which difference signal is fed back to the junction of the bilateral circuit with the station. By applying the signal from the modulator output and the incoming signal to the detector, a feedback path is completed which permits hybridless exchange of signals between connected stations.

According to one aspect of this illustrative embodiment, the common transmission network connects the bilateral circuits of three or more stations in a cascaded loop to maintain a conference connection. The outgoing signal from one of the stations is applied through the cascaded loop to the remaining stations and is returned to the junction of the one station with its bilateral circuit, at which junction it is subtracted from the initially applied outgoing signal to provide stable hybridless operation. In this manner, each station receives signals from the other stations associated with the cascaded loop.

In accordance with another aspect of this illustrative embodiment, each bilateral circuit comprises a phase locked loop. The carrier signals from the phase locked loops are locked to each other at a common carrier frequency and signals are simultaneously exchanged between the connected stations.

In accordance with another aspect of this illustrative embodiment, a plurality of bilateral circuits comprising frequency modulators are coupled to a common transmission line and the frequency modulated signals from stations associated with bilateral circuits having the same carrier frequency are exchanged. The carrier frequency is determined by comparing an harmonically rich carrier control signal applied to all stations with a signal at each station derived from an addressing means. In this manner, a plurality of harmonically related carrier signals selectively interconnect a plurality of pairs of stations through the common transmission line.

In accordance with yet another aspect of this illustrative embodiment, a hybridless bilateral circuit is connected between a transmission network and a transmitter and receiver which may be the transmitting and receiving transducers of a telephone subset remotely located from the bilateral circuit. The transmission path between the bilateral circuit and the remotely located transducers is a wireless path, and the bilateral circuit controls the carrier frequency of the signals applied to the wireless path. An antenna is included at each terminal of the wireless path to transmit signals between the bilateral circuit and circuitry associated with the remotely located transducers without regeneratively coupling back the transmitted signal to its source.

In a second illustrative embodiment of this invention, the bilateral circuit arrangement comprises a delta modulator wherein changes in the outgoing signal from a station are sampled by periodically recurring pulses, and the delta modulated outgoing signal is coupled to the common transmission path. The modulated outgoing signal is applied together with a similarly modulated signal incoming from the common network to an integrator arrangement which demodulates the modulated signals and applies the resultant to the connected station.

In accordance with an aspect of this second illustrative embodiment, two stations are selectively interconnected via bilateral circuits and the interconnection network. The network terminates in a two-terminal amplifier which amplifies signals from the network and returns the amplified signals back to the network. Each bilateral circuit samples the outgoing signal from its associated station. The first bilateral circuit produces positive pulses and the second bilateral circuit produces negative pulses. These sampled outgoing signals are applied to the two terminal amplifier which is responsive to the polarity of the sum of the two sampled outgoing signals. Signals in the form of pulses from the two-terminal amplifier are then applied through the network to integrators in the bilateral circuits which demodulate and couple them to the connected stations so that signals are exchanged between the two stations.

GENERAL DESCRIPTION

Figure 1:
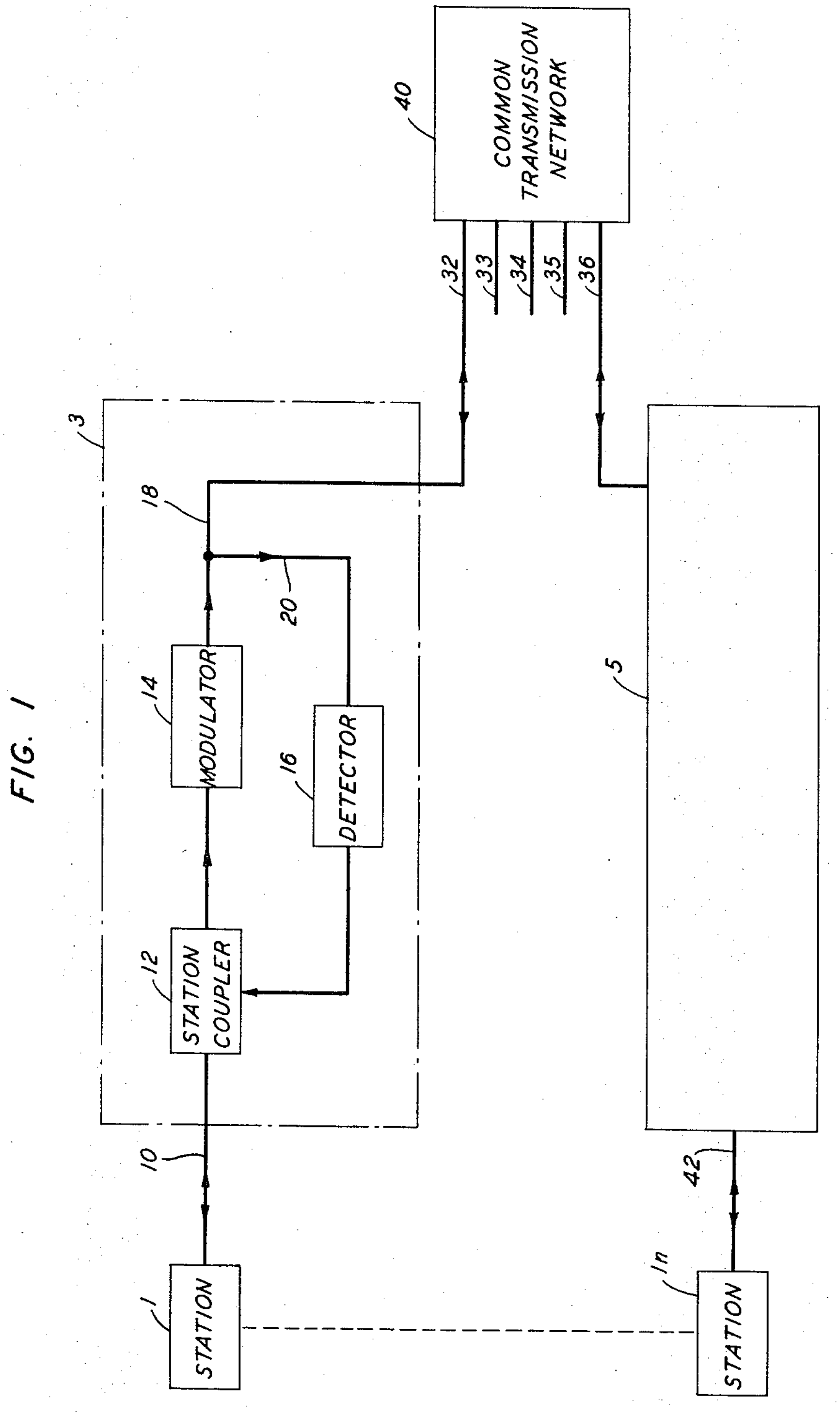
FIG. 1 depicts a general block diagram of a signal transfer system embodying my invention.

FIG. 1 shows a general block diagram of a signal transfer system in which a plurality of stations 1 through 1*n* may be interconnected in accordance with my invention. Each station is connected to common transmission network 40 via one of the hybridless bilateral transmission circuits 3 through 3*n*. Common transmission network 40 may comprise interconnection arrangements such as a switching network, a fixed interconnection scheme connecting pairs of stations from stations 1 through 1*n*, or a multiplex switching arrangement. Station 1, shown in detail, is connected to network 40 via bilateral transmission circuit 3 which comprises station coupler 12, modulator 14 and demodulator 16.

Outgoing signals from station 1 are coupled via line 10 to station coupler 12 and therefrom to modulator 14. Modulated outgoing signals from modulator 14 are coupled to network 40 via two wire line 32 and are also applied to demodulator 16 via line 20. Signals from network 40 which may originate in another of stations 1 through 1*n* are transmitted over lines 32 and 20 to demodulator 16.

In demodulator 16, the sum of the modulated outgoing signals and modulated incoming signals is demodulated and applied to station coupler 12. The signal at the output of demodulator 16 is thereby coupled to line 10. The portion of the signal from demodulator 16 responsive to the modulated outgoing signal from station 1 is in phase opposition to and partially cancels the modulated outgoing signal to maintain stable transmission and the portion responsive to the modulated incoming signal from the interconnected station is transmitted to station 1. The existence of a negative feedback path in each bilateral circuit and in the loop comprising interconnected bilateral circuits insures a stable response to outgoing signals by returning these signals, oppositely phased, to the originating tation. Thus, in accordance with my invention, signals are exchanged between station 1 and network 40 through a hybridless bilateral circuit. Another station of stations 1 through 1*n* is similarly connected to network 40. This station then receives signals from station 1 and transmits modulated signals to circuits 3 through network 40.

The outgoing signal from each station passes through the common transmission network and the bilateral circuit of the interconnected station and is returned via the bilateral circuit of the originating station as a negative feedback signal which is compared to the original outgoing signal. The presence of the fed back return signal insures that the outgoing signal and any change therein has been transmitted to the interconnected station so that signals can be simultaneously transferred between the stations without hybrid connections.

Figure 2:
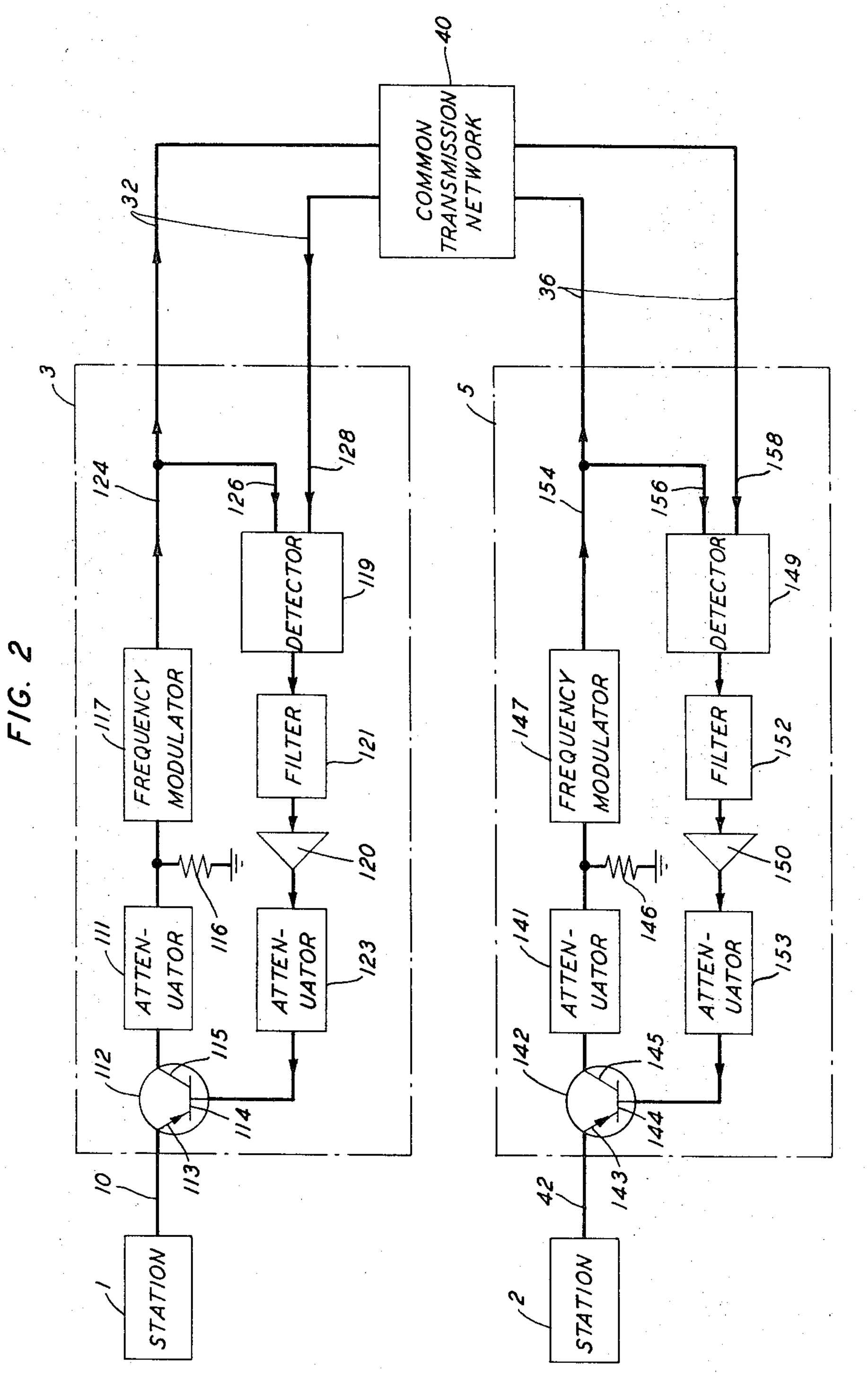
FIG. 2 depicts a first illustrative embodiment of my invention incorporated in the system of FIG. 1 and utilizing frequency modulation.

DETAILED DESCRIPTION (1) Frequency modulated signal transfer systems.—In FIG. 2, station 1 is shown connected to common transmission network 40 via a bilateral transmission circuit comprising frequency modulator 117, product detector 119, amplifier 120 and transistor 112. Station 2 is similarly connected through a frequency modulated bilateral transmission circuit to network 40. It is to be understood that network 40 may comprise a switching network through which a plurality of stations can be selectively interconnected. Outgoing signals from station 1 are coupled to emitter 113 of transistor 112 through line 10, and therefrom to collector 115 through attenuator 111 to frequency modulator 117. Frequency modulator 117 may for example be a voltage controlled oscillator, the output frequency of which varies directly with the voltage of the outgoing signal from attenuator 111. The signal from modulator 117 modulated by the outgoing signal is transmitted through line 32 to common transmission network 40 and therefrom through lines 36 and 158 to product detector 149. Line 32 may be a four-wire line as shown in FIG. 2 or a two-wire line where proper decoupling or signal combination arrangements known in the art are provided. The modulated outgoing signal from station 1 is also applied via line 126 to detector 119. This detector may be a product detector well known in the art. Signals incoming from network 40 to station 1, which includes return signals responsive to the modulated outgoing signal and signals originating in station 2, are also applied to detector 119 via network 40 and lines 32 and 128.

Detector 119 demodulates the sum of the signals on lines 126 and 128. The signal from detector 119 is applied to filter 121. This filter passes the information containing components of the signal from detector 119 which information component is then transmitted through amplifier 120 and attenuator 123 to base 114. Amplifier 120 is a non-inverting amplifier. Amplifier 150 of bilateral circuit 5, however, is an inverting amplifier. This arrangement provides negative feedback in the transmission path between stations 1 and 2. Thus, the signal at base 114 has a component responsive to information transmitted from station 2 and this component is fed back to station 2 via the base collector path of transistor 112. It also passes through the base-emitter path of transistor 112 to emitter 113 and through line 10 to station 1. The component of the signal at base 114 responsive to the modulated outgoing signal from station 1 is fed back to emitter 113 of transistor 112 together with a return signal from line 128 so that a stable response to the outgoing signal is obtained.

Each bilateral circuit of FIG. 2 comprising a voltage controlled oscillator and a detector which demodulates the phase difference between the modulated outgoing signal and the returning incoming signal is a form of phase-locked loop circuit well known in the art. The voltage controlled oscillator generates a carrier signal which is transmitted to the interconnected station. Since the bilateral circuits are connected in a feedback loop, the carrier signal frequencies of the bilateral circuits may be locked to each other so that a common carrier frequency is applied to the interconnected stations.

For purposes of description of the feedback arrangement, it is assumed that an outgoing signal from station 1 is applied to line 10 but no outgoing signal from station 2 is applied to line 42. It is to be understood that signals may be simultaneously transmitted in both directions between stations 1 and 2. It is also assumed that attenuators 111 and 141 have attenuation factors $n_1$ and $n_2$, respectively, and that attenuators 123 and 153 have attenuation factors $m_1$ and $m_2$, respectively. Stations 1 and 2 are further assumed to have output impedances $z_1$ and $z_2$ associated with them so that a signal voltage at the output of station 1 must pass through the station impedance $z_1$ before being applied to emitter 113 and signals from emitter 143 are applied to $z_2$ which represents the load impedance of station 2 in the absence of a signal therefrom.

The transfer function of the signal transfer system including the two bilateral transmission circuits shown in FIG. 2 may be derived from the following. If the outgoing signal voltage from station 1 is $v_{s1}$, a current $i_1$ flows through impedance $z_1$ and a voltage $v_1$ appears at emitter 113. The current in collector 115 responsive to a signal voltage $v_1$ is substantially $i_1$ in accordance with the well known principles of transistor operation. This collector current passes through attenuator 111 and the current $i_1/n_1$ therefrom is applied to resistor 116. The voltage across resistor 116 which is further coupled to frequency modulator 117 is $$\frac{i_1}{n_1}R$$

which is equal to $$\frac{v_{s1}-v_1}{n_1 z_1}R.$$

Figure 9:
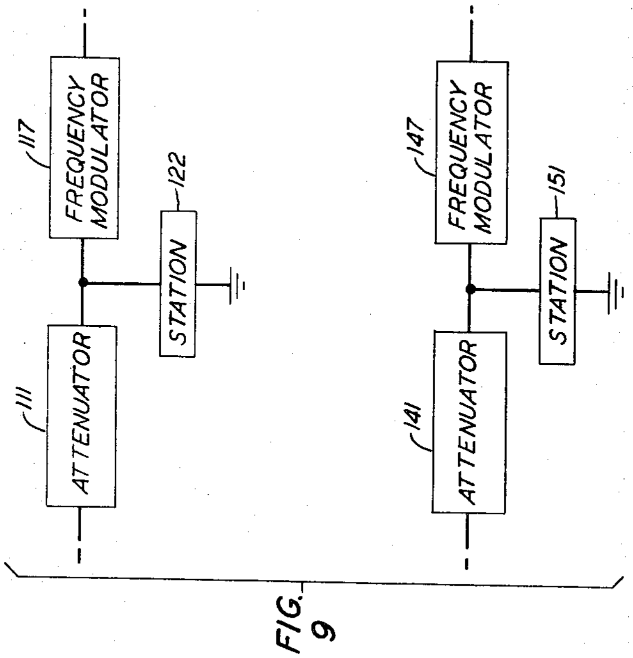
FIG. 9 shows the details of a modification to FIG. 2 which allows additional stations to be connected in the illustrative embodiment depicted in FIG. 2.

The modulated signal responsive to the voltage coupled to modulator 117 is applied to detector 119 and through line 32, network 40, and lines 36 and 158 to detector 149. As a result of the transmission of the modulated signal, a voltage $-v_2$ appears at emitter 143 because of inverting amplifier 150 so that the current applied to station 2 is $-v_2/z_2$. This current is applied to attenuator 141 via the emitter-collector path of transistor 142. Thus, the voltage across resistor 146 is $v_2R/n_2z_2$. It is assumed that the values of impedances 116 and 146 are both equal to R. It is to be understood that unequal values of impedances may also be used. The frequency modulated signal responsive to the voltage $v_2R/n_2z_2$ is transmitted via line 136, network 40, and lines 32 and 128 to detector 119 and also through line 156 to detector 149. It is to be understood that impedances 116 and 146 may each comprise a station so that a conference connection can be maintained. FIG. 9 shows an arrangement in which station 122 is connected to attenuator 111 and modulator 117 of FIG. 2. Station 122 replaces impedance 116 of FIG. 2 and circuit 3 operates in the same manner as described as long as the impedance of station 122 is the same as impedance 116. In like manner, station 151 of FIG. 9 may replace impedance 146 of FIG. 2.

The demodulated signal at the output of detector 119, which, in this embodiment is proportional to the phase difference between frequency modulators 117 and 147, must be equal to the voltage $m_1v_1/A$ since the voltage at base 114 is substantially equal to the voltage $v_1$ at emitter 113 and the attenuation factor of attenuator 123 is $m_1$. The output of detector 149 similarly is $m_2v_2/A$. Since detectors 119 and 149 receive substantially the same signals so that $$\frac{m_2v_2}{A}=\frac{m_1v_1}{A}$$

and $$v_1=\frac{m_2}{m_1}v_2 \qquad (1)$$

Frequency modulators 117 and 147 may be voltage controlled oscillators and as is well known in the art the instantaneous frequency changes of the input signals to modulators 117 and 147 are proportional to the derivative of the phase of the output signals from modulators 117 and 147.

The derivative relationship may be expressed as $$s\Phi_1=f_1 \qquad (2)$$
$$s\Phi_2=f_1$$

where $\Phi_1$ and $\Phi_2$ are phase modulated signals from modulators 117 and 147, respectively, $f_1$ and $f_2$ are the instantaneous frequency changes of the signals applied to modulators 117 and 147, respectively, and $s$ represents the derivative function in operational notation well known in the art. But $f_1$ represents the instantaneous frequency changes of the signal $i_1R/n$ and $f_2$ represents the instantaneous frequency changes of the signal $v_2R/n_2z_2$. Therefore, the phase difference signal obtained from detectors 119 and 149 is $$\Phi_1-\Phi_2=\frac{K}{s}\left[\frac{i_1R}{n_1}-\frac{v_2R}{n_2z_2}\right] \qquad (3)$$

where K is proportionally constant relating the signals $i_1R/n_1$ and $v_2R/n_2z_2$ to $f_1$ and $f_2$, respectively. As hereinbefore stated, $$i_2=\frac{v_{s1}-v_1}{z_1} \text{ and } v_1=\frac{m_2}{m_1}v_2$$

Substituting the last mentioned equations into Equation 3, the ratio of the incoming signal voltage $v_2$ at station 2 to the outgoing signal voltage $v_{s1}$ from station 1 is $$\frac{v_2}{v_{s1}}=\frac{\frac{m_1}{m_2}}{1+\frac{m_1n_1z_1}{m_2n_2z_2}+\frac{m_1n_1z_1}{ARK}} \qquad (4)$$

When the gain A is sufficiently large to make the term $m_1n_1z_1s/AR$ negligible, the transfer function $$\frac{v_2}{v_{s1}}=\frac{\frac{m_1}{m_2}}{1+\frac{m_1n_1}{m_2n_2}\frac{z_1}{z_2}} \qquad (5)$$

It is to be understood that the gain A may be partially or wholly due to the gain through modulators 117 or 147 and that Equation 5 represents the transfer function from station 1 to station 2. Because of the symmetrical nature of the bilateral transmission arrangement, the transfer function $v_1/v_{s2}$ from station 2 to station 1 may be obtained by interchanging subscripts in Equation 5.

The impedance presented by the bilateral transmission circuit connected between station 1 and common transmission network is $v_1/i_1$ where $v_1$ is the signal voltage applied to emitter 113 and $i_1$ is the current flowing into emitter 113 from station 1 through impedance $z_1$. The current $i_1$ is equal to $$\frac{v_{s1}-r_1}{z_1}$$

so that the input impedance, the terminating impedance at the junction of the first station and bilateral circuit 3, is $$z_{in}=\frac{z_1}{\frac{v_{s1}}{v_1}-} \qquad (6)$$

From Equations 2 and 5

$$\frac{v_{s1}}{v_1}=1+\frac{m_1n_1z_1}{m_2n_2z_2} \qquad (7)$$

Therefore, $$z_{in}=\frac{m_2n_2}{m_1n_1}z_2 \qquad (8)$$

If the attenuation factors $m_1$, $m_2$, $n_1$ and $n_2$ are each equal to unity, the input impedance is equal to $z_2$ so that the outgoing signal from station 1, $v_{s1}$, is in effect applied to the series connected impedances $z_1$ and $z_2$ of stations 1 and 2. Where $z_1$ is equal to $z_2$, these impedances are matched and one-half the signal $v_{s1}$ is transmitted to station 2. Thus, the signal transfer system including the bilateral transmission circuits is equivalent to a direct connection between the stations.

The attenuators may also be arranged so that $$\frac{m_2n_2}{m_1n_1}=\frac{z_1}{z_2} \qquad (9)$$

In this case, the input impedance described by Equation 8 is equal to $z_1$ and station 1 is matched to the bilateral circuit even though the impedances of the connected stations are not equal. In this manner, a transformation of impedance is obtained whereby the stations appear to be connected via a simple transformer arrangement. The above described arrangement is also effective as a transformer for D.C. signals.

Figure 3:
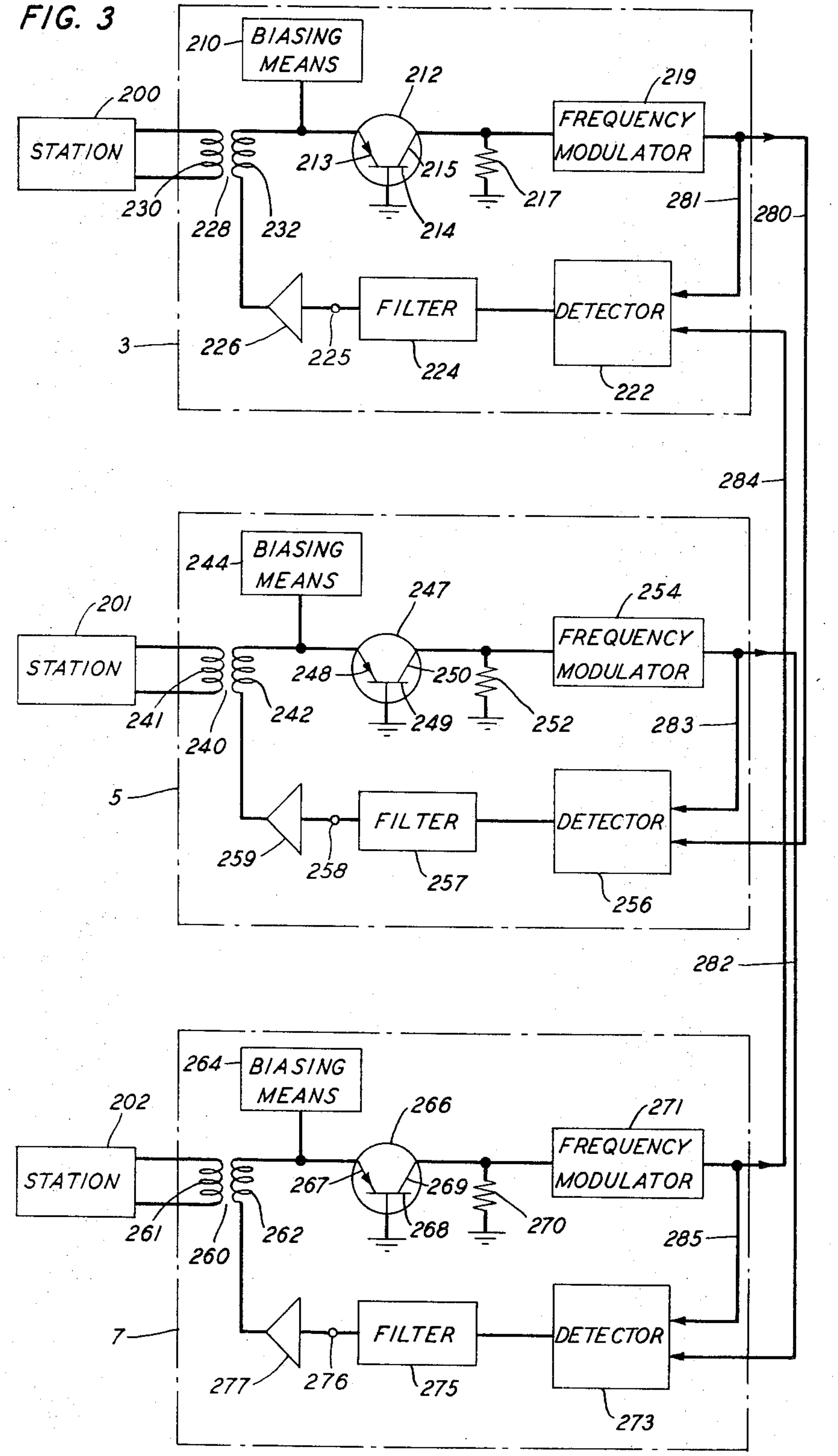
FIG. 3 depicts a conference connection in the system according to the embodiment illustrated in FIG. 2.

FIG. 3 illustrates a conference scheme wherein each of three stations 200, 201 and 202 are interconnected through bilateral transmission circuits 3, 5 and 7, respectively. An outgoing signal from station 200 is applied to emitter 213 of transistor 212 via 1:1 transformer 228. Base 214 is connected to a ground return path to complete the base-emitter path connections of transistor 212. The outgoing signal passes through the emitter-collector path of transistor 212 and is applied to frequency modulator 219, which as before may comprise a voltage controlled oscillator. The frequency modulated signal therefrom is further applied to detector 256 via line 280, and detector 222 via line 281. Each detector which may be a product detector generates a signal proportional to the difference between its inputs as previously mentioned so that the output signal from detector 256 is responsive to the signal from station 200. After filtering and amplification in filter 257 and amplifier 259, the demodulated outgoing signal from station 200 is applied to station 201 through transformer 240, causing a signal voltage to appear at station 201 and a signal to be applied to emitter 248 of transistor 247.

The signal in station 201, responsive to the original outgoing signal, is applied to frequency modulator 254 via collector 250 and resistor 252. It is fed back to detector 256 via line 283 and applied to detector 273 via line 282. The output of detector 273 is now responsive to the outgoing signal from station 200 after it passes through station 201. This output signal is filtered to obtain the information component, the outgoing and incoming signals, of the signal from modulator 254, amplified in amplifier 277 and applied to station 202 via transformer 260. It is further coupled to detector 222 via transistor 266, frequency modulator 271 and line 284 so that transformer 228 receives a feedback signal which stabilizes the transmission of outgoing signals from station 200 to the remaining stations of the conference connection. Amplifiers 226, 259 and 277 are inverting amplifiers to maintain proper phase relationships in the conference circuit feedback loop.

The effect of the feedback loop around the bilateral circuits of the three conferenced stations is to provide the equivalent of a direct connection between the three stations as hereinbefore described with respect to FIG. 2.

For purposes of description, it is assumed that no attenuators are included in the bilateral transmission circuits of FIG. 3. It is understood that attenuator circuits connected in the manner as shown on FIG. 2 may be added. It is further assumed that the characteristic impedances of stations 200, 201 and 202 all have a value of $z$ and that values of resistors 217, 252 and 270 also are equal to $z$. If the outgoing signal from station 200 is $v_{s1}$, then a voltage $v_1$ is applied to emitter 213 and a current $i_1$ flows through impedance $z$ into emitter 213. In response to the current $i_1$, a frequency modulated signal is transmitted from modulator 219 and a voltage $v_2$ is applied to station 201. Similarly, a voltage $v_3$ responsive to the outgoing signal $v_2$ appears at station 202.

The feedback conditions controlling the operation of the conference circuit can be described by the set of simultaneous Equations 10, 11, and 12 each showing the signal voltages at the output of the filters of the bilateral circuits. At terminal 225, preceding amplifier 226, a signal voltage $v_1/A_1$ must appear in order to have a voltage $-v_1$ applied to emitter 213 from station 200 through transformer 228. The current into resistor 217 is $$\frac{v_{s1}-v_1}{z}$$

so that a voltage $v_{s1}-v_1$ is applied in modulated form to product detector 222 via line 281. A voltage $v_3$ is modulated form is similarly applied to detector 222 via line 284. Thus, at point 225

$$v_{s1}=v_1\left(1+\frac{s}{A}\right)+v_3 \qquad (10)$$

The symbol $s$ denotes the time derivative as discussed with respect to FIG. 2. In like manner, the voltage at point 258, preceding amplifier 259, gives rise to $$v_{s1}=v_1+v_2\left(1+\frac{s}{A}\right) \qquad (11)$$

Equation 11 takes into account the transmission of the signal $v_{s1}-v_1$ in modulated form from frequency modulator 219 via line 280 and the frequency modulated output of modulator 254 in response to the signal voltage $v_2$ from station 201. Detector 273 receives the signal voltage $v_2$ in modulated form from modulator 254 and the signal $v_3$ in modulated form from modulator 271. At point 276, preceding amplifier 277, $$v_2=v_3\left(1+\frac{s}{A}\right) \qquad (12)$$

Solving simultaneous Equations 10, 11 and 12 for $v_1$, $v_2$, and $v_3$ and allowing the term $s/A$ to approach zero, results in $v_1=\frac{2}{3}v_{s1}$ and $v_2=v_3=\frac{1}{3}v_{s1}$. Because of the symmetry of the conference circuit arrangement, the response to outgoing signals from stations 201 and 202 is the same, that is, each of the other stations conferenced receives one-third of the outgoing signal.

Since the characteristic or output impedances of the conferenced stations are all equal, the transfer system is equivalent to the three stations connected in series. This is readily seen from a calculation of the impedance presented to the station by its associated bilateral circuit. As noted with reference to FIG. 2, the input impedance at the junction of the first station with its bilateral circuit is $$z_{in}=\frac{z}{\frac{v_{s1}}{v_1}-1}$$

$v_{s1}/v_1$ in this case is 3/2 so that the input impedance is $2z$. Therefore, the total impedance presented to the signal $v_{s1}$ is the series combination of the impedances of each station and as expected the signal transmitted to each of the other conferenced stations is $\frac{1}{3}v_{s1}$. It is to be understood that the foregoing description in which no attenuators are used is given by example only, and that the inclusion of attenuators in the manner of FIG. 2 results in impedance transformation so that any desired matching condition may be obtained.

Figure 4:
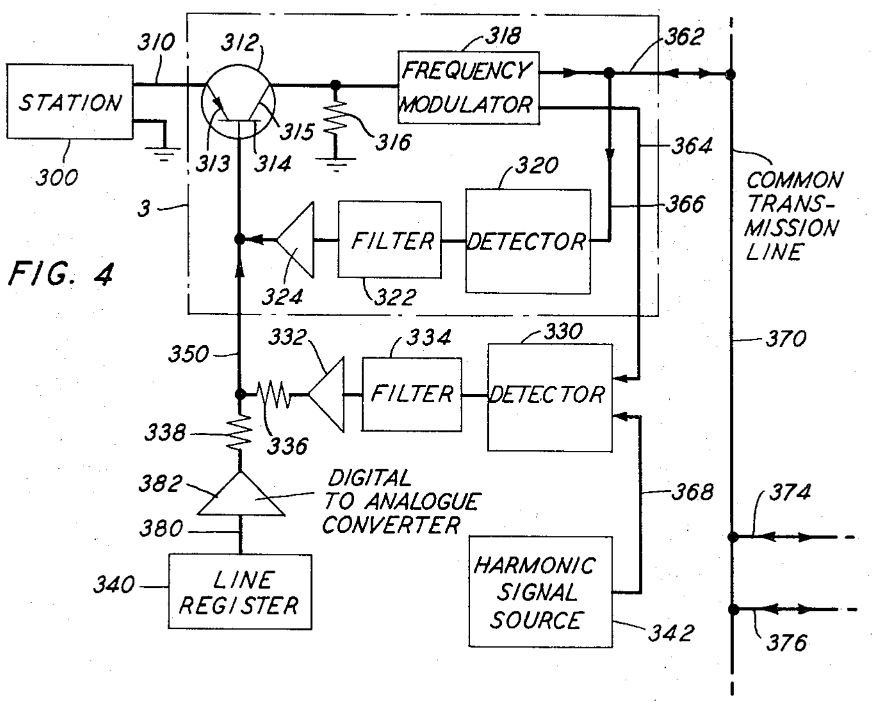
FIG. 4 depicts a frequency division multiplexed arrangement according to the embodiment illustrated in FIG. 2.

A frequency multiplex signal transmission arrangement in accordance with my invention is shown on FIG. 4. Each station therein is connected to common transmission line 370 via a transmission line such as 362, 374, 376, etc. Station 300 is connected to line 370 via bilateral transmission circuit 3 comprising transistor 312, frequency modulator 318, product detector 320, filter 322 and amplifier 324. Other stations are similarly connected via lines 374 and 376.

The bilateral transmission circuit connected to station 300 operates in the manner hereinbefore described. Frequency modulator 318, however, has an additional output which is connected to detector 330 via line 364. Detector 330 receives an input from harmonic signal source 342 via line 368. This harmonic signal source produces a plurality of harmonically related carrier signals $nf$, $(n+1)f$, $(n+2)f$, etc. The output of detector 330 contains a signal proportional to the frequency difference between the carrier frequency of modulator 318 and the harmonic signals from source 342. This frequency difference signal is applied to the base 314 of transistor 312 in conjunction with a signal from digital-to-analog converter 382 which converter derives an analog address code signal from an address code inserted into line register 340. The circuit arrangement including source 342, line register 340, product detector 330, filter 334 and amplifier 332 controls the carrier frequency of frequency modulator 318 which may be a voltage controlled oscillator so that the carrier signal therefrom is locked to only one harmonic signal from source 342. Filter 334 permits only a D.C. signal to pass from detector 330 to the junction between resistors 336 and 338. A second D.C. signal is applied from converter 382 through resistor 338 to this junction. The resulting D.C. signal at the junction of resistors 336 and 338 is transmitted to base 314 through the base collector path of transistor 312 and to frequency modulator 318 to control the frequency of the carrier signal therefrom. This same harmonic signal may also be applied to other stations substantially identical to station 300 so that stations with the same address code operate on the same carrier frequency and are to exchange signals. Stations operating on other harmonic signals may simultaneously exchange information signals via common transmission line 370 without interference.

It should be noted that detector 320 has only a single input from line 366. This arrangement is unlike the detector arrangements previously considered. But signals from line 370 and from modulator 318 can both be applied to the detector over a single line and the same operation is obtained since the signals arriving at modulator 318 from line 370 are rejected by the modulator.

Figure 5:
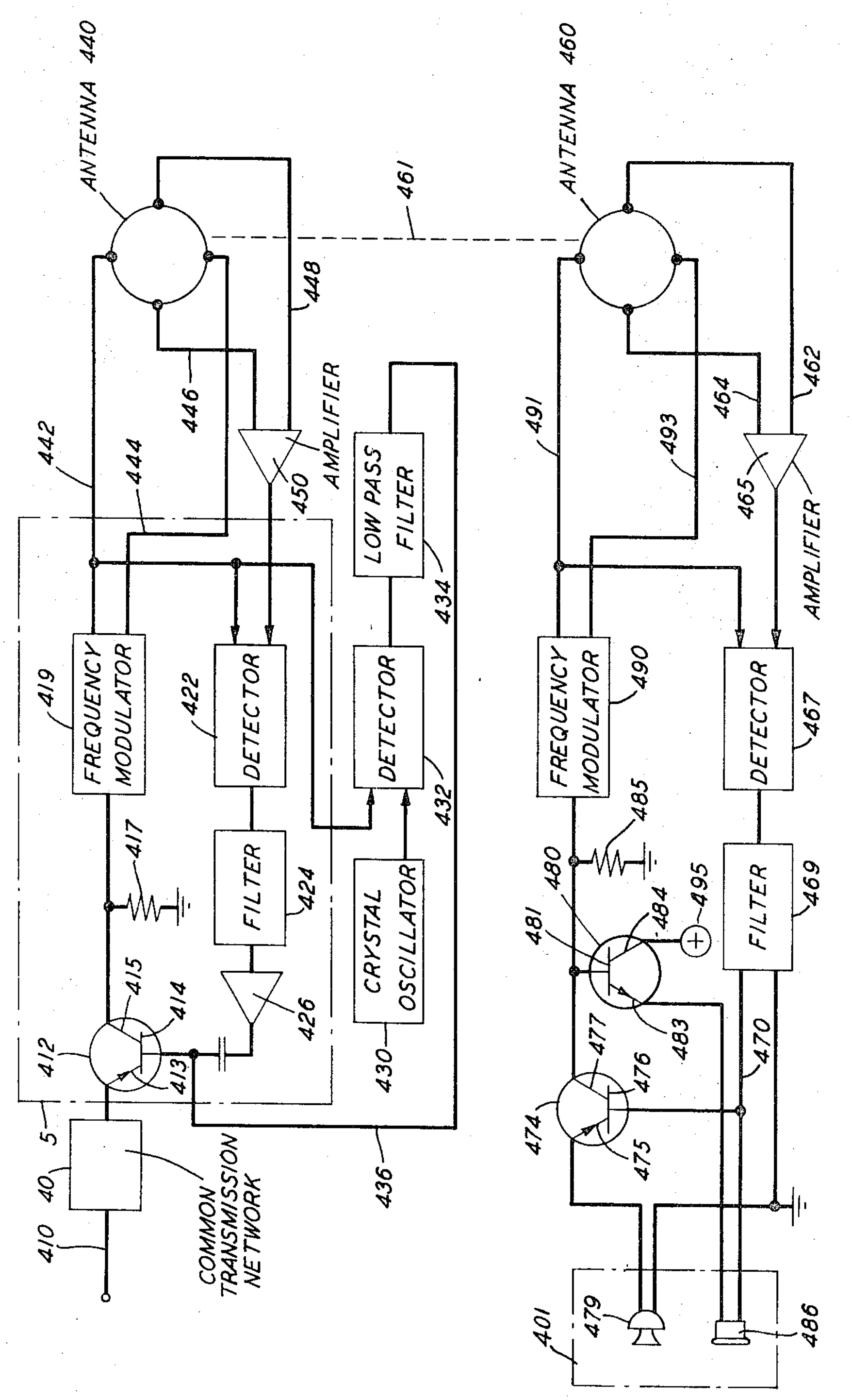
FIG. 5 depicts an arrangement according to the embodiment illustrated in FIG. 2 utilizing wireless connections.

FIG. 5 shows an embodiment of my invention which permits wireless signal transmission between a transmission network and a transmitter and receiver arrangement. The transmission network 40 may be connected to two-wire transmission line 410 and to the bilateral transmission circuit 5 located in the base of a telephone subset. Station transmitter 479 and station receiver 486 form part of the telephone handset which is independent of and may be located remotely from the base. This arrangement is useful where the subset base is located at a control point in a building. The handset may then be located at or carried to any portion of the building within the transmission range of the bilateral circuit 5 in the subset base.

Network 40 permits signals to be exchanged between line 410 and emitter 413 of transistor 412 via network 40. Signals incoming from network 40 are applied to emitter 413 and pass through the emitter-collector path of transistor 412. These signals are transmitted via collector 415 and resistor 417 to frequency modulator 419, and frequency modulated signals from modulator 419 are transmitted to antenna 440 via lines 442 and 444. Modulator 419 is part of the bilateral transmission circuit 5. Signals therefrom are fed back to detector 422 to which signals from antenna 440 are applied via lines 446 and 448 and amplifier 450. These latter signals are received from antenna 460. Antenna 460 is of the type, well known in the art, that isolates signals applied from lines 442 and 444 from signals received via path 461. Similarly, antenna 440 isolates signals applied from lines 491 and 493 from signals received via path 461.

The signals applied to antenna 440 are transmitted via the wireless path 461 to antenna 460 and are coupled to detector 467 via lines 462 and 464 and amplifier 465. The output of detector 467 is filtered as it passes through filter 469 so that a signal is applied to base 476, which signal is responsive to the information from network 40. This signal is applied directly to one terminal of station receiver 486 and causes a current to flow into collector 477 of transistor 474. This current further causes a signal voltage drop across resistor 485 so that a signal voltage appears at emitter 483 and enhances the current flow through receiver 486. The signal voltage drop across resistor 485 is also applied to frequency modulator 490 and therefrom to antenna 460. This frequency modulated signal is coupled to antenna 440 so that detector 422 is responsive to the signal from modulator 490. A signal corresponding to the phase difference between the signals from frequency modulators 419 and 490 appears at the output of detector 422. After passing through filter 424 and amplifier 426, this signal is transmitted to network 40 via base 414, the base-emitter path of transistor 412, and emitter 413. The operation of the circuit shown in FIG. 5 is substantially similar to that of the signal transfer systems hereinbefore described.

A second feedback loop from modulator 419 to base 414 is provided through detector 432 and low pass filter 434. This feedback arrangement introduces a single frequency signal which controls the carrier frequency of modulators 419 and 490. A single frequency signal from crystal oscillator 430 is applied to one input of detector 432, and the frequency modulated signal from modulator 419 is applied to the other input of detector 432. Only the D.C. and very low frequency components of the phase differences between the oscillator frequency and the carrier frequency of modulator 419 are permitted to pass through filter 434 and lead 436. This signal, after amplification in transistor 412, is further transmitted to modulator 419 to control the carrier frequency thereof. Modulator 419 may comprise a voltage controlled oscillator so that the signal from lead 436 directly determines the carrier frequency from modulator 419. This carrier frequency is transmitted to modulator 490 and the carrier frequency of the bilateral circuit associated with the telephone set of station 401 is thereby locked to the frequency of oscillator 430.

Signals from station transmitter 479 are applied to emitter 475 of transistor 474 and are transmitted through the emitter-base path of transistor 474 to base 476. These signals appear on one terminal of telephone receiver 486. The signals from emitter 475 are also transmitted via collector 477 to resistor 485 from which resistor they are applied to base 481 of transistor 480. The signals appearing at collector 477 and consequently emitter 483 are in phase with the signals on base 476. Collector 484 is connected to positive voltage source 495 which provides the collector operating voltage for transistor 480. Therefore, with proper selection of resistor 485, receiver 486 has the same voltage at each of its terminals and no signal voltage appears thereacross. In this way, signals from transmitter 479 may be prevented from appearing at receiver 486. Of course, as is well known in the art, a different value of resistor 485 permits signals to be introduced across receiver 486 to provide sidetone. The signal from transmitter 479 appearing across resistor 485 is also applied to modulator 490 so that the signal transfer arrangement according to my invention allows transmission of signals from telephone transmitter 479 to network 40 in the manner hereinbefore described.

Figure 6:
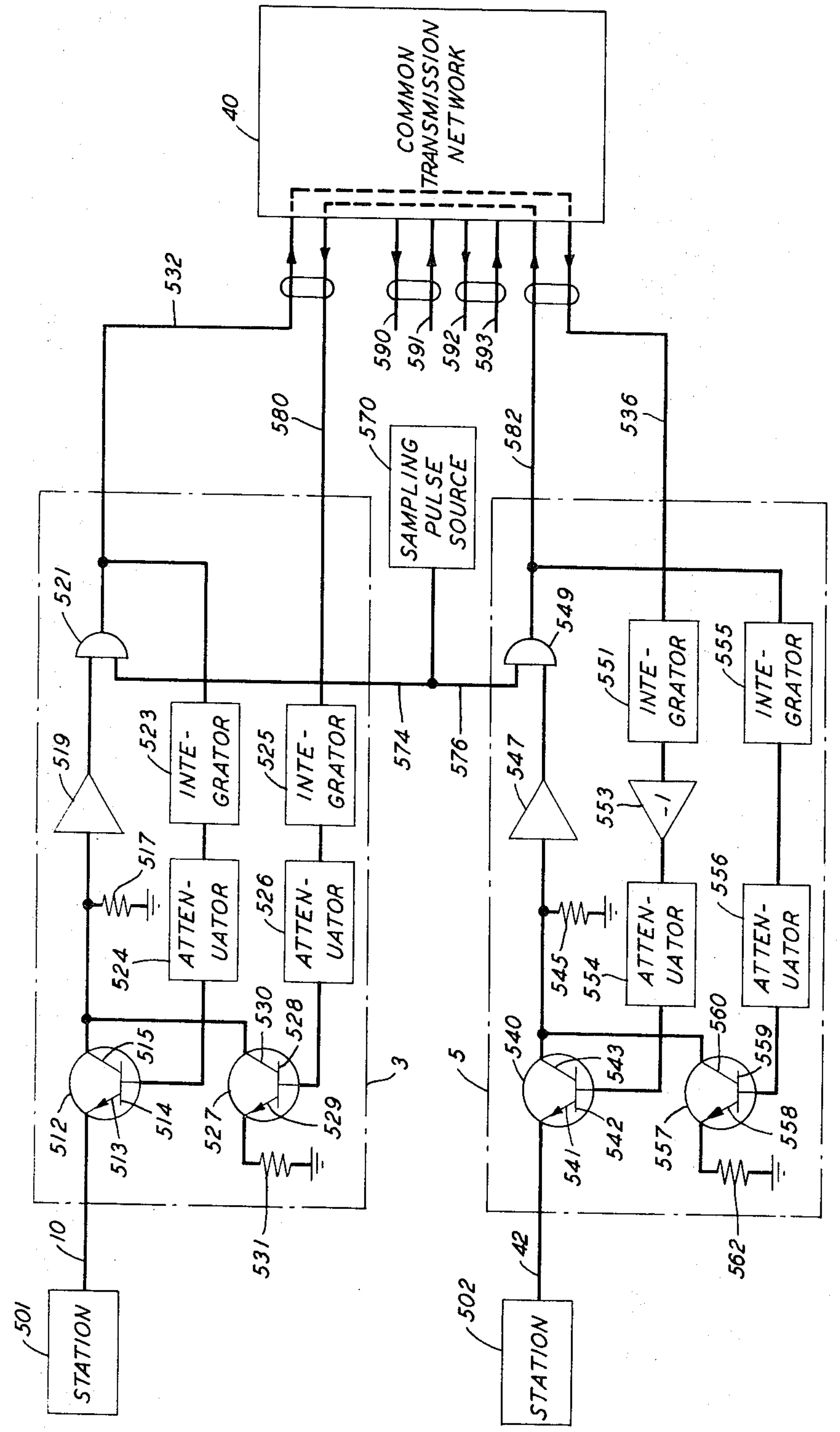
FIG. 6 depicts a second illustrative embodiment of my invention utilizing delta modulation.

(2) Delta modulated signal transfer system.—The signal transfer system in which feedback type bilateral transmission circuits are employed according to my invention is not restricted to frequency modulation. FIG. 6 shows such a signal transfer arrangement in which delta modulation is utilized as the modulation means to transmit signals between stations interconnected by common transmission network 40. Station 501 is connected to bilateral transmission circuit 3 and signals from this bilateral circuit are transmitted via line 532, transmission network 40 and line 536 to bilateral transmission circuit 5 and therefrom to station 502. Signals from station 502 are transmitted via line 582, network 40, line 580 and circuit 3 to station 501.

Each bilateral transmission circuit comprises a delta modulator. In bilateral circuit 3, the delta modulator includes amplifier 519, sampling gate 521, integrator 523 and transistor 512. The gain of amplifier 519 is exceedingly high so that any signal appearing at its input having a positive polarity causes amplifier 519 to produce a constant amplitude positive voltage at its output. A negative signal at the input of amplifier 519 similarly results in a constant amplitude negative voltage at the output of amplifier 519. Gate 521 samples the signal from amplifier 519 when a pulse from sampling pulse source 570 is present. Sampling pulses are applied previously at a rate determined by the bandwidth of the modulating information signal. In accordance with the well-known principles of delta modulators, the sampled output from gate 521 is applied to integrator 523 which may, for example, comprise an RC type integrator. The integrated sample pulses are further applied to base 514 via attenuator 524 and are compared to outgoing signals from station 501 appearing on emitter 513. The difference between the integrated sample signals and the outgoing signal causes a current to appear at the input of amplifier 519 so that any deviation of the outgoing signal from the integrated voltage at base 514 results in an output from amplifier 519. This form of delta modulator is given by example only and it is to be understood that delta modulator arrangements utilizing multivibrators or other circuits may be employed. The modulator arrangements in bilateral circuit 5 are substantially similar except that an additional amplifier 553 is used to reverse the polarities of signals applied to base 542. Inverting amplifier 553 provides negative feedback for signals transmitted between bilateral circuits 3 and 5. Amplifier 547, sampling gate 549 and integrator 551 operate in the hereinbefore described manner.

The high gain of the delta modulator amplifier 519 introduces a problem not encountered in the frequency modulation arrangements hereinbefore described. The current at the input of amplifier 519 is very small because of the high gain. Therefore, additional means must be provided to appropriately match the characteristic impedance of station 501. This impedance matching is accomplished through transistor 527 and impedance 531. The current from collector 515 responsive to an outgoing signal from station 501 is conducted through collector 530, the collector-emitter path of transistor 527, emitter 529 and impedance 531 to ground. In like manner, transistor 557 and impedance 562 perform the impedance matching function in bilateral circuit 5.

In order to describe the operation of the delta modulation signal transfer system of FIG. 6, it is assumed that the characteristic impedance of station 501 and line 10 is $z_1$, the characteristic impedance of station 502 and line 42 is $z_2$, and the values of impedances 531 and 562 are $z_3$ and $z_4$, respectively. It is further assumed that attenuators 524 and 554 have attenuation factors $n_1$ and $n_2$, respectively, and that attenuators 526 and 556 have attenuation factors $m_1$ and $m_2$, respectively. Because the transmission system between station 501 and station 502 is substantially symmetrical, it is only necessary to consider transmission of signals in one direction so that it is assumed that outgoing signals are present only at station 501. It is to be understood that the transfer system of FIG. 6 may be used to simultaneously exchange signals between stations 501 and 502.

If an outgoing signal voltage $v_{s1}$ is present at station 501, a signal voltage $V_1$ appears at emitter 513 because of the voltage drop accross characteristic impedance $z_1$. The sampled signal voltages appearing on line 532 in response thereto are transmitted through network 40 and line 536 to integrator 551 and are also applied to integrator 523. Since the voltage $v_1$ is present at emitter 513, substantially the same voltage appears at base 514 and the signal voltage at the output of integrator 523 must be $n_1v_1$. Integrators 523 and 551 in this embodiment are identical and because the same signal is applied to both, the signal voltage $n_1v_1$ also appears at the output of integrator 551. This signal causes a signal voltage $-v_2$ to appear at emitter 541. The signal voltage $-v_2$ is equal to $$\frac{-n_1}{n_2}v_1$$

because the signal $n_1v_1$ which determines $-v_2$ passes through attenuator 554 and unit gain inverting amplifier 553. In response to the voltage $v_1$, a voltage $v_3/m_1$ appears at emitter 529. Since amplifier 519 has a very high input impedance, the current through impedance 531 ($v_3/m_1z_3$) is equal to the current at collector 515 which is substantially the same as the current $$\left(\frac{v_{s1}-v_1}{z_1}\right)$$

into emitter 513, in like manner, a voltage $v_4/m_2$ appears across impedance 562 so that the current $v_4/m_2z_4$ is substantially equal to the current ($v_2/z_2$) flowing into emitter 541.

The signal voltage at base 528 is, in accordance with well-known transistor principles, substantially equal to the signal voltage at emitter 529, i.e. $v_3/m_1$. Thus, a signal voltage $v_3$ appears at the output of integrator 525. Since integrators 525 and 555 receive identical signals from sampling gate 549, the voltage at the output of integrator 555 is also equal to $v_3$ which voltage $v_3$ produces a signal voltage $v_3/m_2$ at base 559. Thus, $$\frac{v_3}{m_2z_4}=\frac{n_1v_1}{n_2z_2} \qquad (13)$$

The current from collector 515 is equal to the current into collector 530, so that $$\frac{v_{s1}-v_1}{z_1}=\frac{m_2z_4n_1v_1}{m_1z_3n_2z_2} \qquad (14)$$

Equation 14 can be rearranged to describe the signal voltage $v_1$ at emitter 513 in terms of the outgoing signal voltage $v_{s1}$ from station 1 and the parameters of the signal transfer system as shown in Equation 15.

$$\frac{v_1}{v_{s1}}=\left[\frac{1}{1+\frac{z_4}{z_3}\frac{m_2n_1}{m_1n_2}\frac{z_1}{z_2}}\right] \qquad (15)$$

The voltage at station 502 in response to the outgoing signal voltage $v_1$ is $-n_1v_1/n_2$ as previously noted so that the transfer function $v_2/v_{s1}$ can easily be calculated.

The impedance of bilateral circuit 3 as seen by station 501 can be calculated from Equation 6. Substituting Equation 15 into Equation 6, $$z_{in}=\frac{z_1}{\frac{m_2n_1}{m_1n_2}\frac{z_4}{z_3}\frac{z_1}{z_2}} \qquad (16)$$

Where the attenuation factors $m_1$, $m_2$, $n_1$ and $n_2$ are all unity and impedance $z_4$ is equal to impedance $z_3$, the signal voltage $v_2$ is equal to $v_1$ which is $$\frac{v_{s1}}{1+\frac{z_1}{z_2}}$$

Under these conditions, the signal transfer system of FIG. 6 is equivalent to a direct connection between station 501 and station 502. If, however $$\frac{n_1}{n_2}=\frac{m_2}{m_1}=k$$

the voltage $v_2$ equals $kv_1$ and the input impedance is $z_2/k^2$. This latter arrangement is equivalent to a transformer connection between station 501 and station 502. Thus, the signal transfer system utilizing delta modulation gives substantially similar results to that of the frequency modulation system hereinbefore described. It should be noted that if $k^2$ equals $z_1/z_2$, the impedance seen by station 501 at its junction with bilateral circuit 3 is its own characteristic impedance, $z_1$, so that perfect matching may be obtained.

Figure 10:
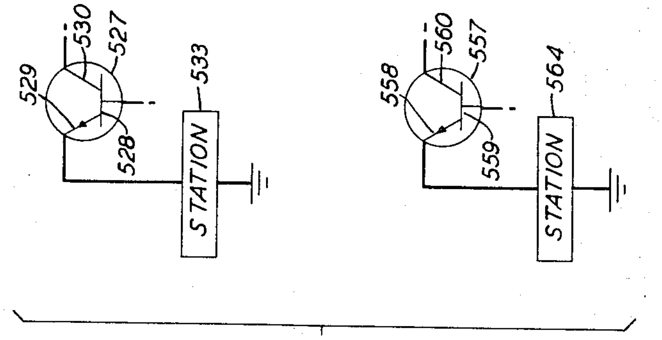
FIG. 10 shows the details of a modification of FIG. 6 by which additional stations are incorporated in the illustrative embodiment depicted in FIG. 6.

Impedances 531 and 562 are shown as passive elements in FIG. 6. It is to be understood, however, that more complex arrangements are possible; for example, impedances 531 and 562 may be replaced by stations whose characteristic impedances are the same as $z_3$ and $z_4$, respectively. If this is done, signals may be exchanged between pairs of stations, each pair of stations being associated with a bilateral circuit. This is so because signals from a station connected to emitter 529 are coupled to amplifier 519 as well as to station 501, and signals from a station connected to emitter 558 are coupled to amplifier 547 as well as to station 502. The substitution of stations for impedances 531 and 562 does not alter the operation of the signal transfer system as described. FIG. 10 shows station 553 connected to emitter 529 of FIG. 6. Station 553 replaces impedance 531 of FIG. 6 and the operation of circuit 3 of FIG. 6 is as described as long as the impedance of station 553 is the same as impedance 531. In like manner, station 564 shown on FIG. 10 may replace impedance 562 of FIG. 6.

Figure 7:
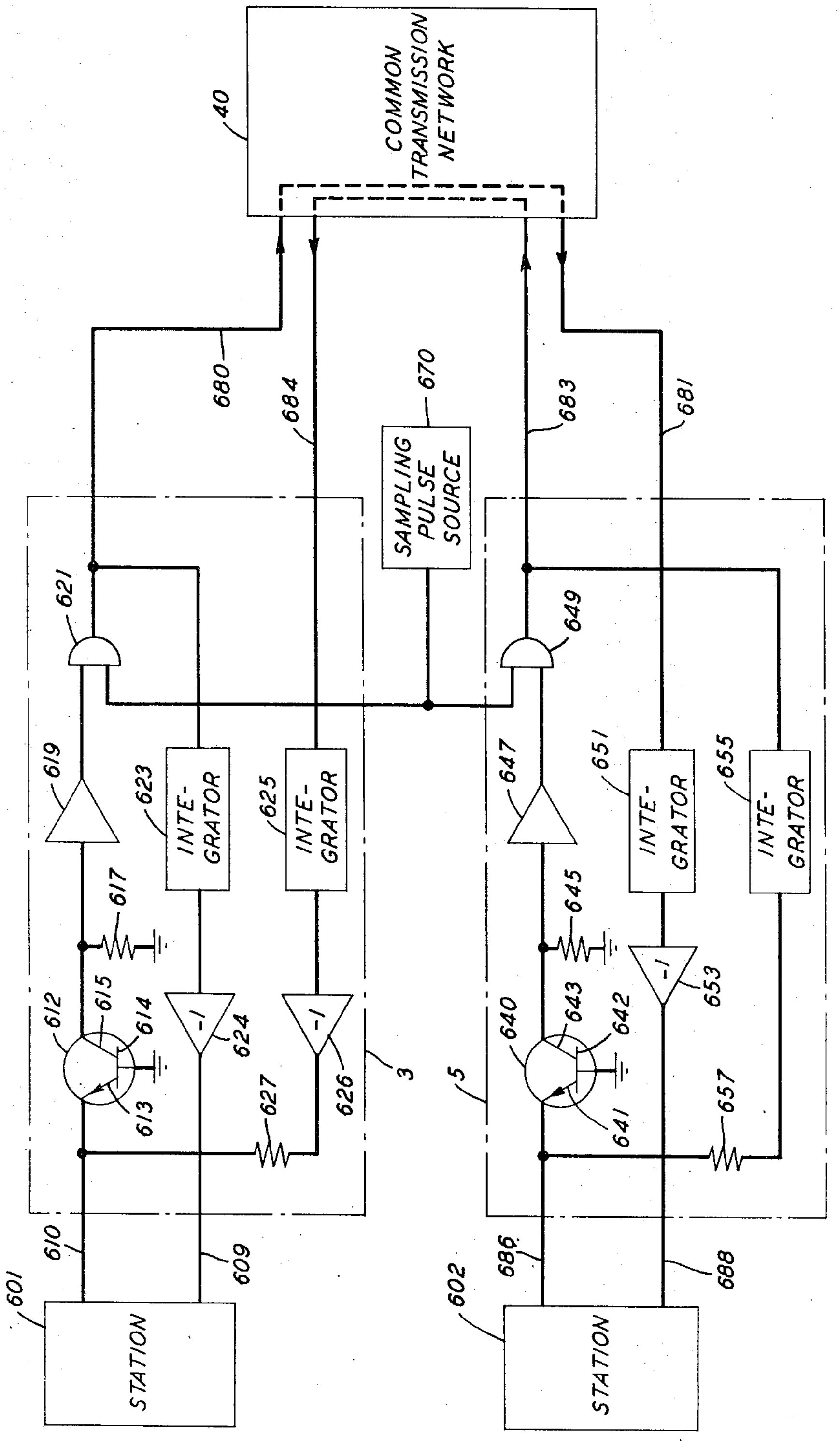
FIG. 7 depicts another form of the second illustrative embodiment of my invention.

Another form of signal transfer system according to my invention in which delta modulation is employed is shown on FIG. 7. The bilateral circuits 3 and 5 differ from the bilateral circuits of FIG. 6 in that in FIG. 7 transistors 527 and 557 are eliminated and the substituted impedances 627 and 657 provide the necessary impedance matching. The delta modulators in bilateral circuits 3 and 5 operate in substantially the same manner as those in FIG. 6. Unity gain inverting amplifiers 624 and 653 are added to provide the proper phase relationships of signals applied to stations 601 and 602 since coupling is eliminated through bases 614 and 642. Inverting amplifier 626 provides the appropriate phase reversal for the negative feedback in the transmission loop including bilateral circuits 3 and 5.

For purposes of description, it is assumed that the characteristic impedances of stations 601 and 602 are $z_1$ and $z_2$, respectively, and that the values of impedances 627 and 657 are $z_3$ and $z_4$, respectively. An outgoing signal $v_{s1}$ from station 601 causes a signal voltage $v_1$ to appear at the outputs of integrators 623 and 651. The voltage $v_1$ is applied through unity gain inverting amplifier 653 and impedance $z_2$ of station 602 to emitter 641. The signal responsive thereto at collector 643 is applied therefrom through high gain amplifier 647 and sampling gate 649 to integrators 625 and 655. The operation of amplifiers 619 and 647 is substantially similar to that described for the corresponding amplifiers in FIG. 6. As a result of the transmission of outgoing signal $v_{s1}$ to station 602, a signal voltage $v_3$ appears at the output of integrators 655 and 625.

Since base 614 of transistor 612 and base 642 of transistor 640 are both at a ground reference potential, the signal voltages at emitters 613 and 641 must both be substantially zero. The current through impedance $z_1$ is then equal to the current through impedance $z_3$ and the current through impedance $z_2$ is also the same as that current through impedance $z_4$. Thus $$\frac{v_{s1}-v_1}{z_1}=\frac{v_3}{z_3} \qquad (17)$$

and $$\frac{v_3}{z_4}=\frac{v_1}{z_2} \qquad (18)$$

Combining Equations 17 and 18

$$\frac{v_1}{v_{s1}}=\frac{1}{1+\frac{z_1}{z_2}\frac{z_4}{z_3}} \qquad (19)$$

Figure 11:
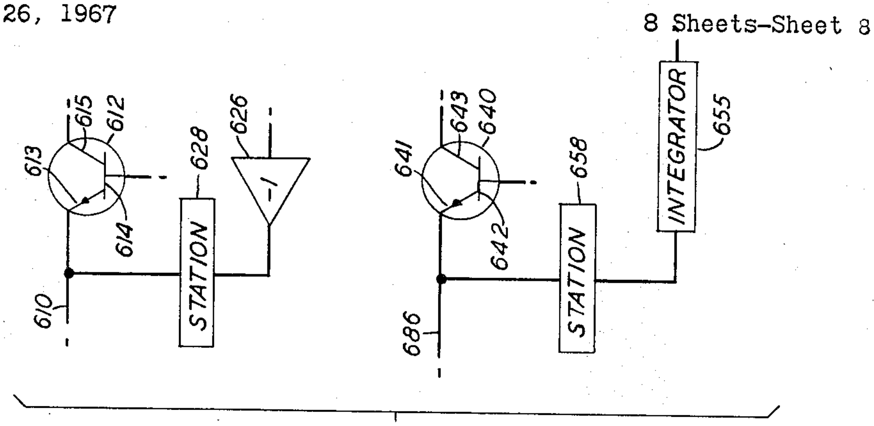
FIG. 11 shows the details of a modification of FIG. 7 in which additional stations are incorporated in the illustrative embodiment depicted therein.

Equation 19 is identical to Equation 15 for attenuation factors $m_1$, $m_2$, $n_1$ and $n_2$ equal to unity. Therefore, this circuit arrangement is equivalent to a direct connection between stations 601 and 602 and the equations describing its operation are identical to those of FIG. 6. Attenuators can be included in FIG. 7 in a manner similar to that of FIG. 6 so that the signal transfer system of FIG. 7 is equivalent to a transformer connection between the stations 601 and 602. Impedances 627 and 657 may each comprise an active station, the impedance of which is equal to $z_3$ or $z_4$ as may be appropriate. This is shown in FIG. 11 where station 628 is connected between amplifier 626 and emitter 613 of FIG. 7 and station 658 is connected between integrator 655 and emitter 641 of FIG. 7.

Figure 8:
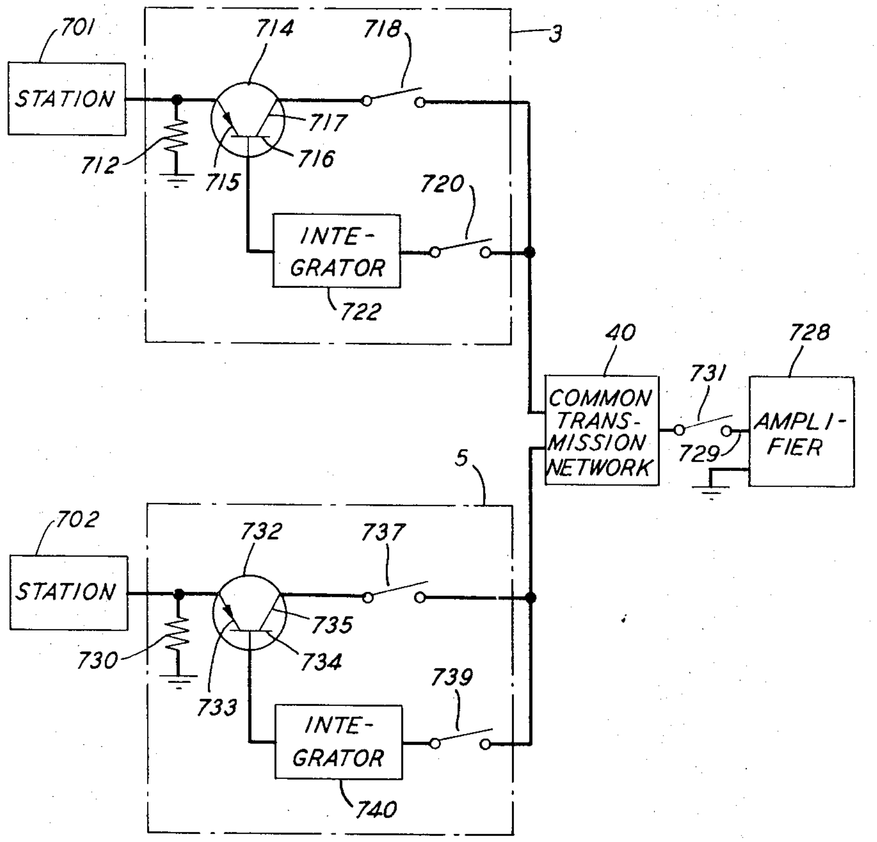
FIG. 8 depicts yet another form of the second illustrative embodiment of my invention in which a common reflex type amplifier is included in the delta modulator.

The circuit of FIG. 8 illustrates another embodiment of the delta modulated signal transfer system in accordance with my invention. In this embodiment, a single reflex amplifier 728 is connected to common transmission network 40 to replace the delta modulator amplifiers shown on FIGS. 6 and 7. In FIG. 8, outgoing signals from station 701 are applied to emitter 715 via impedance 712. These outgoing signals are coupled through the emitter-collector path of transistor 714 and applied through sampling switch 718 to network 40. Outgoing signals from station 702 are similarly applied through transistor 732 and sampling switch 737 to network 40. The sampling switches 718 and 738 operate simultaneously and in accordance with the well-known principles of delta modulation. The sampled outgoing signals from bilateral circuit 3 are always positive, and the sampled outgoing signals from bilateral circuit 5 are always negative.

The sum of the sampled outgoing signals from circuits 3 and 5 is applied to two terminal amplifier 728 through network 40 via switch 731, which switch operates in synchronism and simultaneously with switches 718 and 737. If the signal applied to amplifier 728 via lead 729 from station 701 is greater than the signal from station 702, amplifier 728 generates a positive pulse. Alternatively, if the signal from station 702 is greater than the signal from station 701, amplifier 728 generates a negative pulse. This generated pulse appears on lead 729 and is transmitted back through switch 731 and network 724 to switches 720 and 739 which are closed after the comparison of outgoing signals is made. The pulses passing through switches 720 and 739 are then integrated in integrators 722 and 740, respectively, and applied to base 716 of transistor 714 and base 734 of transistor 732. The signals are fed back therefrom to stations 701 and 702 through the base-emitter paths of transistors 714 and 732, respectively, so that signals are simultaneously exchanged between the stations by means of delta modulation. The exchange of signals between stations 701 and 702 is similar in principle to that described with respect to FIGS. 6 and 7. The use of a common two terminal amplifier associated with network 724 reduces the complexity of the signal transfer arrangement and results in a more economical system.

It is to be understood that the hereinbefore-described embodiments are merely illustrative of the principles of my invention. Numerous other arrangements and variations may be devised by those skilled in the art without departing from the spirit and scope of my invention.

1. A signal transfer system comprising a plurality of stations and a transmission path having a hybridless circuit coupled to each of said stations for transferring signals between stations interconnected via said path and a transmission network interconnecting said hybridless circuits, junction means interconnecting each station with its coupled bilateral circuit, each of said hybridless circuits comprising means for generating a first signal derived from a signal outgoing from the corresponding station, means for applying said first signal to said network, means for generating a second signal derived from the sum of said first signal and any signal incoming from said network, and means for applying said second signal to said junction means.

2. A hybridless signal transfer system comprising a plurality of stations, a transmission network and a bilateral circuit associated with each of said stations for transferring signals between stations interconnected via said network, junction means for interconnecting each station with its associated bilateral circuit, each of said bilateral circuits comprising means for modulating a carrier signal with a signal responsive to an outgoing signal from the associated station, means for applying said modulated carrier signal to said network, means for generating a second signal responsive to the sum of said modulated carrier signal and any signal incoming from said network, and feedback means for applying said second signal to said junction means.

3. A hybridless signal transfer system according to claim 2 wherein said network comprises means for selectively interconnecting said associated station and a second one of said plurality of stations, each of said associated and second stations has a characteristic impedance, and said feedback means comprises means for presenting an impedance at said junction equivalent to the characteristic impedance of said second station.

4. A signal transfer system for exchanging signals among stations interconnected by a network comprising a bilateral circuit associated with a first plurality of said stations, a junction interconnecting each of said first plurality of said stations with its associated bilateral circuit, said bilateral circuit comprising means for generating a carrier signal, means for coupling an outgoing signal from each station of said first plurality of stations to said generating means to modulate said carrier signal, means for applying the resultant modulated carrier signal to said network, means for generating a second signal corresponding to the sum of said modulated carrier signal and any signal incoming from said network, and means for applying said second signal to said junction between each station of said first plurality of stations and its associated bilateral circuit.

5. A hybridless signal transfer system for exchanging signals between selectively interconnected first and second stations via a transmission network, a bilateral circuit associated with each of said stations, junction means for interconnecting each station with its bilateral circuit, said bilateral circuit associated with said first station comprising means for modulating a carrier signal with an outgoing signal from said first station, means for applying a control signal to said junction means comprising means for producing a signal proportional to the sum of said modulated carrier signal and any signal incoming from said second station and means for demodulating said produced signal, and means for coupling said modulated carrier signal to said second station.

6. A hybridless signal transfer system according to claim 5 wherein said modulating means comprises means for frequency modulating a carrier signal with said outgoing signal, and said demodulating means comprises means for demodulating the phase difference between said modulating means output signal and said incoming signal whereby the frequency of the carrier signal from each of said bilateral circuits is the same.

7. A hybridless signal transfer system according to claim 6 and further comprising a transistor at said junction, the input electrode being connected to said first station, the output electrode being connected to said modulating means, and amplifying means connected between said demodulating means and the control electrode.

8. A hybridless signal transfer system according to claim 6 wherein said bilateral circuit further comprises a transistor having emitter, base and collector electrodes, said outgoing signal being applied to said emitter electrode, said collector electrode being connected to said modulating means, amplifying means connected to said base electrode and means connected between said demodulating means and said amplifying means for permitting only said outgoing and incoming signals from said demodulating means to be applied to said base electrode.

9. A hybridless signal transfer system according to claim 6 wherein each of said first and second stations has an associated output impedance and said associated bilateral circuit further comprises first attenuating means connected between said junction and said frequency modulating means, and said control signal applying means comprises second attenuating means connected between said demodulating means and said junction, the terminating impedance at said junction being the product of the output impedance of said second station and the ratio of the product of the attenuation factors of the first and second attenuation means of the bilateral circuit corresponding to said second station to the product of the attenuation factors of said first and second attenuation means.

10. A hybridless signal transfer system according to claim 9 wherein said attenuation factors product ratio equals the ratio of the output impedance of said first station to the output impedance of said second station whereby each of said terminating impedances is equal to the output impedance of the corresponding station.

11. A signal transfer system for exchanging signals among a plurality of stations comprising a distinct hybridless bilateral circuit coupled to each of said stations, junction means for interconnecting each station with its coupled bilateral circuit, and means for selectively interconnecting said bilateral circuits in a closed cascaded loop, each of said bilateral circuits comprising means for modulating a signal with an outgoing signal from its associated station, means for producing a signal equivalent to the sum of said modulated signal and a signal incoming from the preceding bilateral circuit in said loop, means for demodulating said sum signal and means for feeding back said demodulated sum signal to said junction means, and means for applying the modulated signal from each of said bilateral circuits in the loop as the incoming signal to the succeeding bilateral circuit in the loop.

12. A signal transfer system according to claim 11 wherein said modulating means comprises frequency modulating means, and said coupling comprises a transformer having first and second windings and a coupling device having first, second and third electrodes, said first winding being connected to said associated station, one terminal of said second winding being connected to receive a signal corresponding to said demodulated sum signal from said demodulating means, the other terminal of said second winding being connected to said first electrode, said second electrode being connected to a ground return path and said third electrode being connected to said frequency modulating means.

13. A system for exchanging signals between a transmission line and a station comprising first and second hybridless bilateral circuits, a wireless path interconnecting said first and second bilateral circuits, first junction means interconnecting said first bilateral circuit with said line and second junction means interconnecting said second bilateral circuit with said station, said first bilateral circuit comprising first means for producing a frequency modulated carrier signal corresponding to a signal incoming from said line, antenna means for applying said produced frequency modulated carrier signal to said wireless path and for receiving a signal from said wireless path, means for demodulating a signal proportional to the phase difference between said produced frequency modulated carrier signal and said signal received from said wireless path, means for applying the output of said demodulating means to said first junction means, a single frequency signal source, means for generating a control signal proportional to the frequency difference between a signal from said single frequency source and said incoming frequency modulated carrier signal, and means for applying said control signal to said first junction means, said second bilateral circuit comprising means for producing a frequency modulated carrier signal corresponding to an outgoing signal from said station, antenna means for applying said outgoing frequency modulated carrier signal to said wireless path, means for demodulating a signal proportional to the phase difference between said outgoing frequency modulated carrier signal and said incoming frequency modulated carrier signal, and means for applying the output of said second demodulating means to the said second junction means, each said antenna means comprising means for isolating the applied frequency modulating signal from the signal incoming from the other of said first and second bilateral circuits.

14. A signal exchanging system according to claim 13 wherein said station comprises a transmitter and a receiver, the junction with said station comprises a transistor, and said second bilateral circuit further comprises a coupling transistor, the collector of said junction transistor being connected to the base of said coupling transistor, the emitter of said coupling transistor being connected to one terminal of said station receiver, and the other terminal of said station receiver being connected to the base of said junction transistor, whereby outgoing signals from said station transmitter are blocked from said station receiver.

15. A system for transferring signals between selectively interconnected stations comprising a hybridless bilateral circuit associated with each of said stations, a transmission line commonly connected to all of said bilateral circuits, each of said bilateral circuits comprising a modulator, first means for coupling an outgoing signal from its associated station to said modulator, said modulator being responsive to said outgoing signal to produce a modulated carrier signal, means for generating a signal corresponding to the phase difference between said modulated carrier signal and a signal incoming from said transmission line, means for demodulating said generated signal, feedback means for applying the output of said demodulating means to said first coupling means, second means for coupling said modulated carrier signal to said transmission line, and means responsive to said modulated carrier signal for controlling the carrier frequency of said modulator to match the carrier frequency of said incoming signal.

16. A signal transfer system according to claim 15 wherein said carrier frequency controlling means comprises a source of harmonically related single frequency signals, means for storing a station address code, a detector connected to said signal source and said modulator for generating a signal proportional to the difference between said carrier frequency and the frequency of one of said harmonically related signals, means for comparing said detector output with the output of said station address code storing means and means for applying the comparison resultant to said coupling means.

17. A signal transfer system for exchanging signals via a transmission path between a first station and a second station comprising a hybridless bilateral circuit associated with each of said stations, junction means for interconnecting each station with its associated circuit, each of said bilateral circuits comprising a phase-locked loop having means for producing a frequency modulated carrier signal, means for coupling an outgoing signal from the associated station to said frequency modulating means, means for generating a second signal corresponding to the sum of the output of said frequency modulating means and any signal incoming from said path, and means for applying said second signal to said junction means interconnecting said bilateral circuit with said associated station, said second signal generating means comprising means for demodulating the phase difference between said frequency modulating means output and said incoming signal, whereby the carrier signals utilized in each of said associated bilateral circuits are of the same frequency.

18. A hybridless signal transfer system comprising means for interconnecting selected stations of a plurality of stations and a bilateral circuit associated with each of said stations for simultaneously transferring signals between the associated stations and said interconnecting means, junction means for interconnecting each station with its associated bilateral circuit, each of said bilateral circuits comprising means for modulating a carrier signal with an outgoing signal from the associated station, first means for demodulating said modulated carrier signal, second means for demodulating a signal incoming from said interconnecting means, means connected to said first and second means for generating a second signal proportional to the sum of the demodulated resultant modulated carrier signal and the demodulated signal incoming from said interconnecting means, negative feedback means for applying said second signal to said junction means, and means for coupling said modulated carrier signal to said interconnecting means.

19. A hybridless signal transfer system according to claim 18 and further comprising a source of repetitive pulses constituting the carrier signal, said modulating means comprising a delta modulator including means for generating a pulse of the polarity of the difference between said outgoing signal and said second signal and wherein said first and second demodulating means comprise integrating means.

20. A hybridless signal transfer system according to claim 19 wherein said pulse generating means comprises amplifying means for providing a constant amplitude signal and means for sampling said constant amplitude signal with pulses from said pulse source.

21. A hybridless signal transfer system according to claim 20 wherein each of said bilateral circuits comprises first and second coupling devices having input, output and control electrodes, the output electrodes of said first and second coupling devices being connected together and to the input of said amplifying means, the input electrode of said first coupling device being connected to said associated station, the bilateral circuit associated with one of said stations further comprising means connecting the control electrode of the corresponding first coupling device to said first demodulating means and means connecting the control electrode of the corresponding second coupling device to said second demodulating means, and the bilateral circuit associated with a station connected to said one station further comprising means for connecting the control electrode of the corresponding first coupling device to said second demodulating means and for connecting the control electrode of the corresponding second coupling device to said first demodulating means.

22. A hybridless signal transfer system according to claim 20 wherein each of said bilateral circuits comprises a coupling device having input, output and control electrodes and impedance means having two terminals, the input electrode being connected to a first terminal of said associated station and to one terminal of said impedance means, the output electrode being connected to the input of said amplifying means and the control electrode being connected to a ground reference potential, the bilateral circuit associated with a first one of said stations further comprising means for connecting the other terminal of the corresponding impedance means to said second demodulating means and means for connecting the first demodulating means to another terminal of said first station, the bilateral circuit associated with a second one of said stations further comprising means for connecting the other terminal of the corresponding impedance means to said first demodulating means and means for connecting the second demodulating means to another terminal of said second station.

23. A signal transfer system for selectively interconnecting first and second stations having a first hybridless bilateral circuit associated with said first station, a second hybridless bilateral circuit associated with said second station, a transmission network connected to each of said bilateral circuits, means for applying an outgoing signal from each of said first and second stations to said associated bilateral circuits, said first bilateral circuit comprising means for generating repetitive pulses of a first polarity modulated by a signal responsive to the outgoing signal from said first station, said second bilateral circuit comprising means for generating repetitive pulses of a second polarity modulated by a signal responsive to the outgoing signal from said second station, means associated with said transmission network for producing a signal corresponding to the sum of said modulated pulses from said first and second bilateral circuits, means responsive to the polarity of said sum signal for generating a pulse of the same polarity as said sum signal, means in each of said bilateral circuits for integrating the pulses from said generating means, and means for applying said integrated pulses to the associated station.

References Cited

UNITED STATES PATENTS

| | | | |
|---|---|---|---|
| 2,064,896 | 12/1936 | Espenschied et al. | 325—5 X |
| 2,136,984 | 11/1938 | Smith | 178—58 |
| 2,457,986 | 1/1949 | Edson | 343—175 |
| 2,704,362 | 3/1955 | Bergan | 343—175 |
| 2,991,353 | 7/1961 | Barnes | 325—17 X |
| 3,453,395 | 7/1969 | Englund | 179—170 |

RICHARD MURRAY, Primary Examiner

B. V. SAFOUREK, Assistant Examiner

U.S. Cl. X.R.

179—170; 325—45, 51, 53